(12) United States Patent
Abe et al.

(10) Patent No.: US 12,174,422 B2
(45) Date of Patent: Dec. 24, 2024

(54) OPTICAL CIRCUIT

(71) Applicant: Nippon Telegraph and Telephone Corporation, Tokyo (JP)

(72) Inventors: Makoto Abe, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 333 days.

(21) Appl. No.: 17/637,033

(22) PCT Filed: Aug. 23, 2019

(86) PCT No.: PCT/JP2019/033133
§ 371 (c)(1),
(2) Date: Feb. 21, 2022

(87) PCT Pub. No.: WO2021/038643
PCT Pub. Date: Mar. 4, 2021

(65) Prior Publication Data
US 2022/0283366 A1  Sep. 8, 2022

(51) Int. Cl.
*G02B 6/125* (2006.01)
*G02B 6/12* (2006.01)
*G02B 6/122* (2006.01)

(52) U.S. Cl.
CPC ........... *G02B 6/125* (2013.01); *G02B 6/1223* (2013.01); *G02B 2006/12038* (2013.01)

(58) Field of Classification Search
CPC ........ G02B 6/125; G02B 6/43; G02B 6/4214; G02B 6/12002; G02B 2006/12119;
(Continued)

(56) References Cited

U.S. PATENT DOCUMENTS

| | | | | |
|---|---|---|---|---|
| 5,313,536 A | * | 5/1994 | Rossi | G02B 6/43 385/14 |
| 6,907,173 B2 | * | 6/2005 | Hiramatsu | G02B 6/1221 385/39 |
| 7,561,765 B2 | * | 7/2009 | Funabashi | G02B 6/12004 385/14 |
| 8,295,003 B2 | * | 10/2012 | Chou | G11B 5/6088 385/32 |

(Continued)

FOREIGN PATENT DOCUMENTS

| | | | | |
|---|---|---|---|---|
| CN | 103415796 A | * | 11/2013 | ............. G02B 6/125 |
| JP | H04271308 A | | 9/1992 | |

(Continued)

OTHER PUBLICATIONS

Abe, M., "Silica-based waveguide devices for photonic networks," Journal of the Ceramic Society of Japan, vol. 116, No. 10, Sep. 2, 2008, 8 pages.

(Continued)

*Primary Examiner* — Michelle R Connelly
(74) *Attorney, Agent, or Firm* — Slater Matsil, LLP

(57) ABSTRACT

A second core includes a first portion, a second portion, and a bending portion. In the first portion, a wave-guiding direction is a first direction parallel to a plane of a first substrate. In the second portion, a wave-guiding direction is a second direction that is at a predetermined angle with respect to the plane of the first substrate. For example, in the second portion, the wave-guiding direction is the second direction that is at substantially 90 degrees with respect to the plane of the first substrate. The bending portion connects the first portion and the second portion. A relative refractive index difference between the second core and a cladding of the second optical waveguide preferably has a value such that the propagation loss in the bending portion is equal to or smaller than 0.1 dB.

16 Claims, 8 Drawing Sheets

(58) Field of Classification Search
CPC ...... G02B 6/12004; G02B 6/12; G02B 6/122; G02B 6/13
See application file for complete search history.

(56) References Cited

U.S. PATENT DOCUMENTS

| | | | | |
|---|---|---|---|---|
| 9,810,843 | B2* | 11/2017 | Stephens | G02B 6/131 |
| 10,162,112 | B2* | 12/2018 | Sutherland | G02B 6/3608 |
| 10,302,859 | B1* | 5/2019 | Martin | G02B 6/24 |
| 10,564,354 | B2* | 2/2020 | Fortusini | G02B 6/125 |
| 10,641,953 | B1* | 5/2020 | Vashishtha | G02B 6/4226 |
| 10,914,895 | B2* | 2/2021 | Liao | H01L 25/18 |
| 11,493,705 | B2* | 11/2022 | Shikama | G02B 6/4231 |
| 11,867,956 | B2* | 1/2024 | Lin | G02B 6/4204 |
| 2010/0266295 | A1* | 10/2010 | Zheng | H04B 10/801 398/201 |
| 2011/0090557 | A1 | 4/2011 | Ide et al. | |
| 2019/0293866 | A1* | 9/2019 | Novack | G02B 6/124 |
| 2020/0209477 | A1 | 7/2020 | Shikama et al. | |

FOREIGN PATENT DOCUMENTS

| | | |
|---|---|---|
| JP | 2002156539 A | 5/2002 |
| JP | 2002323627 A | 11/2002 |
| JP | 2004151175 A | 5/2004 |
| JP | 2007163658 A | 6/2007 |
| JP | 2011085746 A | 4/2011 |
| WO | 2018225820 A1 | 12/2018 |

OTHER PUBLICATIONS

Hibino, Y., "An Array of Photonic Filtering Advantages Arrayed-Waveguide-Grating Multi/Demultiplexers for Photonic Networks," IEEE Circuits & Devices, Nov. 2000, 7 pages.

Himeno, A. et al., "Silica-Based Planar Lightwave Circuits," IEEE Journal of Selected Topics in Quantam Electronics, vol. 4, No. 6, Nov./Dec. 1998, 12 pages.

Kawachi, M., "Silica waveguides on silicon and their application to integrated-optic components," Optical and Quantum Electronics, vol. 22, Sep. 1990, 26 pages.

Ogawa, I. et al., "Single-Chip 16-ch Variable Attenuator Multiplexer (V-AWG) with Stacked PD-Array Using Integrated Micro-Mirrors on PLC," IEEE, Oct. 22, 2005, 2 pages.

Terui, H. et al., "Novel Micromirror for Vertical Optical Path Conversion Formed in Silica-Based PLC Using Wettability Control of Resin," Journal of Lightwave Technology, vol. 16, No. 9, Sep. 1998, 9 pages.

* cited by examiner

-- PRIOR ART --

OPTICAL CIRCUIT

This patent application is a national phase filing under section 371 of PCT application no. PCT/JP2019/033133, filed on Aug. 23, 2019, which application is hereby incorporated herein by reference.

TECHNICAL FIELD

The present invention relates to lightwave circuits constituted of optical waveguides.

BACKGROUND

In order to construct and upgrade optical communication networks having large capacity and flexibility, planar lightwave circuits (PLCs) such as a Y-branch power splitter constituted of an optical waveguide, a Mach-Zehnder interferometer (MZI), an optical switch utilizing the MZI, and an arrayed waveguide grating (AWG) have been developed. These lightwave circuits have become important key devices of photonic network systems based on wavelength-division multiplexing (WDM) optical transmission systems that have been constructed in recent years. In the lightwave circuits, a large number of elements such as optical switches, optical variable attenuators, and wavelength multiplexers/demultiplexers have been complexed, densely integrated, and miniaturized (for example, Non Patent Literatures (NPLs) 1, 2, 3, and 4).

The optical waveguides constituting these lightwave circuits are made of, for example, a quartz-based optical waveguide mainly composed of quartz-based glass, which is produced on a quartz glass substrate or a silicon substrate. Quartz-based optical waveguides have characteristics such as low propagation loss, high reliability and stability, and good processability. The quartz-based optical waveguides have good compatibility with quartz-based optical fibers and thus exhibit low loss and high reliability even when connected with standard quartz-based optical fibers for communication.

In order to achieve a higher level of integration and a reduction in footprint, research and development for element integration has also been carried out to implement integration in which semiconductor elements such as a photodetector (PD) and a semiconductor laser are mounted being stacked in layers, not only within a plane of a lightwave circuit but also on a top surface of an optical waveguide. In the technology of integration by stacking in layers, a technique to change a direction of an optical axis (light path) to a direction vertical to a plane that is parallel to a substrate of a lightwave circuit is one of the most important key techniques, and many studies, researches, and developments thereof have been carried out. A large number of techniques to change a direction of the light path to the vertical direction using a mirror have been studied (NPLs 3, 5, and 6).

For example, as illustrated in FIG. 6, a mirror 303 is provided midway in an optical waveguide 302 formed above a substrate 301, a direction of a light path of light guided in the optical waveguide 302 is changed to a direction vertical to a plane of the substrate 301, and the light is received by a photodiode 305 disposed on a spacer 304. The mirror 303 is constituted by a slope that is formed facing an outgoing end face obtained by providing a groove or the like in the optical waveguide 302. The slope is angled approximately 45 degrees with respect to the plane of the substrate 301. The slope is made of resin, glass, or the like, and the reflectivity thereof is increased, for example, by depositing a metal such as Au or Al on the surface or by making a dielectric multilayer film thereon.

CITATION LIST

Non Patent Literature

NPL 1: Y. Hibino, "An Array of Photonic Fitting Advantages, Arrayed-Waveguide-Grating Multi/Demultiplexers for Photonic Networks", IEEE Circuits & Devices, pp. 21-27, 2000.

NPL 2: A. Himeno, et al., "Silica-Based Planar Lightwave Circuits", IEEE Journal of Selected Topics in Quantum Electronics, vol. 4, no. 6, pp. 913-924, 1998.

NPL 3: M. ABE et al., "Silica-based waveguide devices for photonic networks", Journal of the Ceramic Society of Japan, vol. 116, no. 10, pp. 1063-1070, 2008.

NPL 4: M. KAWACHI et al., "Silica waveguides on silicon and their application to integrated-optic components", Optical and Quantum Electronics, vol. 22, pp. 391-416, 1990.

NPL 5: H. Terui and K. Shutoh, "Novel Micromirror for Vertical Optical Path Conversion Formed in Silica-Based PLC Using Wettability Control of Resin", Journal of Lightwave Technology, vol. 16, no. 9, pp. 1631-1639, 1998.

NPL 6: I. Ogawa et al., "Single-Chip 16-ch Variable Attenuator Multiplexer (V-AWG) with Stacked PD-Array Using Integrated Micro-Mirrors on PLC", IEEE Proc. LEOS2005, TuL1, pp. 268-269, 2005.

SUMMARY

Technical Problem

As described above, when the light path of the guided light is to be changed by the mirror 303, the light is once output to a space that does not have a light confinement structure, and thereafter the light is reflected by the mirror 303 in many cases. In these cases, the light having been output to the space through the end face of the optical waveguide 302 diffracts and spreads out. The distance that the light travels, after being output from the optical waveguide 302, until the light reaches the photodiode 305 is several tens of micrometers, and the beam diameter of the light having reached the diode also widens to be substantially several tens of micrometers, depending on the thickness of a cladding of the optical waveguide 302, the thickness of the spacer 304, or the like.

In order to receive the light whose beam diameter widens as described above, a light-receiving area of the photodiode 305 is increased. As the light-receiving area of the photodiode becomes larger, the response speed thereof decreases. In applications where a high-speed response is required, the light-receiving diameter of the photodiode is required to be substantially not greater than ten-odd micrometers. For this reason, as illustrated in FIG. 7, it is necessary to provide a light collection function by disposing a lens 306 in a light path extending from an outgoing end of an optical waveguide 302 to a photodiode 305a to reduce the beam diameter of light that reaches the photodiode 305a. The light collection function may be obtained by using a concave mirror as the mirror 303.

When a semiconductor laser is integrated as a light source and is very close to the end face of the optical waveguide, it is possible to bring the optical waveguide into optical coupling directly with the semiconductor laser and perform highly efficient coupling. However, in an optical-coupling optical system via a mirror, similar to the light-receiving optical system using the photodiode, the beam diameter of outgoing light from laser light widens in a section where the light propagates through a space. Therefore, in order to perform highly efficient optical coupling between the semiconductor laser to be integrated and the optical waveguide, it is necessary to integrate a lens system or add a light collection function such as a concave mirror.

Further, a manufacturing error of a mirror surface or a mirror supporter causes an increase in coupling loss between the photodiode and the laser. As discussed above, in the lightwave circuit, the integration of a lens or the like and the addition of the light collection function such as a concave mirror, or the like lead to increases of the manufacturing process, the adjustment process at the mounting time, and the like, which may bring about a reduction in manufacturing yield, an increase in manufacturing cost, degradation in performance, and difficulty in securing reliability.

Embodiments of the present invention have been contrived to solve the above-described problems, and an object thereof is to make it possible to manufacture a lightwave circuit more easily without causing degradation in performance and reliability.

Means for Solving the Problem

A lightwave circuit according to embodiments of the present invention includes a first optical waveguide formed on a first substrate; and a second optical waveguide formed on a second substrate and including a first portion in which a wave-guiding direction is a first direction parallel to a plane of the first substrate, a second portion in which a wave-guiding direction is a second direction that is at a predetermined angle with respect to the plane of the first substrate, and a bending portion configured to connect the first portion and the second portion, wherein an angle formed between the plane of the first substrate and a plane of the second substrate is the predetermined angle, and an incoming/outgoing end of the first optical waveguide is optically connected to an incoming/outgoing end of the first portion of the second optical waveguide.

Effects of Embodiments of the Invention

As described above, according to embodiments of the present invention, a light path of the guided light is changed in the second optical waveguide including the bending portion, and therefore it is possible to produce the lightwave circuit more easily without causing the degradation in performance and reliability.

DETAILED DESCRIPTION OF ILLUSTRATIVE EMBODIMENTS

Figure 1:
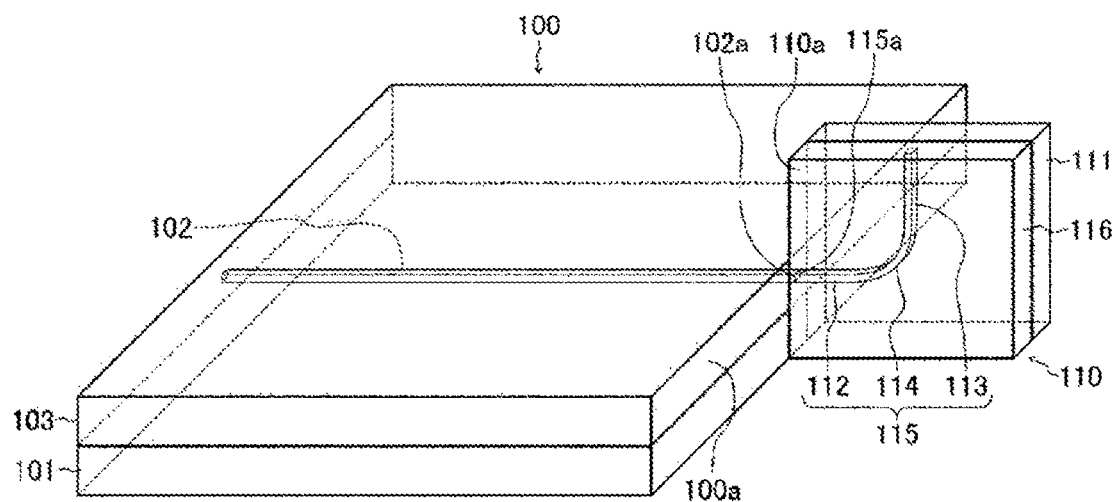
FIG. 1 is a perspective view illustrating a configuration of a lightwave circuit according to an embodiment of the present invention.

Hereinafter, a lightwave circuit according to an embodiment of the present invention will be described with reference to FIG. 1. The lightwave circuit includes a first optical waveguide 100 constituted of a first core 102 formed above a first substrate 101, and a second optical waveguide 110 constituted of a second core 115 formed above a second substrate 11. The first core 102 is embedded in a cladding 103. The second core 115 is embedded in a cladding 116. The first optical waveguide 100 and the second optical waveguide 110 are quartz-based optical waveguides mainly composed of quartz-based glass.

The second core 115 includes a first portion 112, a second portion 113, and a bending portion 114. In the first portion 112, a wave-guiding direction is a first direction that is parallel to a plane of the first substrate 101. In the second portion 113, a wave-guiding direction is a second direction that is at a predetermined angle with respect to the plane of the first substrate 101. For example, in the second portion 113, the wave-guiding direction is the second direction that is at substantially 90 degrees with respect to the plane of the first substrate 101. The bending portion 114 connects the first portion 112 and the second portion 113. The first portion 112, the second portion 113, and the bending portion 114 integrally constitute the second core 115. A relative refractive index difference Δ between the second core 115 and the cladding 116 of the second optical waveguide 110 preferably has a value such that the propagation loss in the bending portion 114 is equal to or smaller than 0.1 dB.

The angle formed between the plane of the first substrate 101 and the plane of the second substrate 111 is the above-mentioned predetermined angle. For example, the angle formed between the plane of the first substrate 101 and the plane of the second substrate 111 is substantially 90 degrees. An incoming/outgoing end 102a of the first optical waveguide 100 is optically connected to an incoming/outgoing end 115a of the first portion 112 of the second optical waveguide 110. For example, a side surface 110a of the second optical waveguide no at a portion including the first portion 112 is in contact with a side surface 100a on which the incoming/outgoing end 102a of the first optical waveguide 100 is disposed.

Figure 2A:
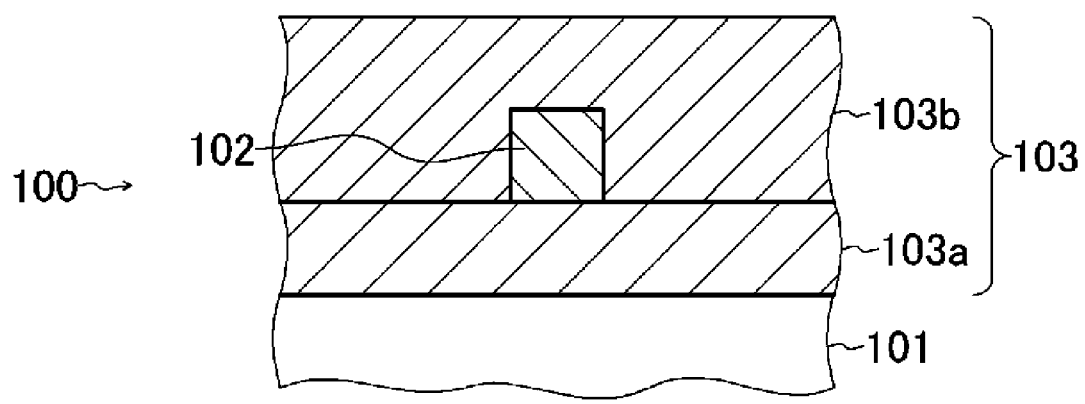
FIG. 2A is a cross-sectional view illustrating part of a configuration of the lightwave circuit according to an embodiment of the present invention.

As illustrated in FIG. 2A, the first optical waveguide 100 is constituted of a lower cladding layer 103a formed on the first substrate 101, the first core 102 formed on the lower cladding layer 103a, and an upper cladding layer 103b formed on the lower cladding layer 103a while covering the first core 102. The cladding 103 is constituted of the lower cladding layer 103a and the upper cladding layer 103b.

Figure 2B:
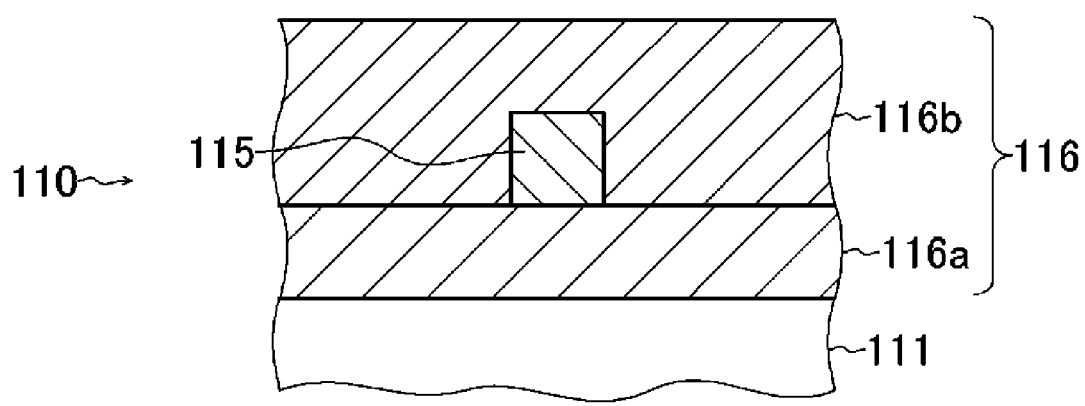
FIG. 2B is a cross-sectional view illustrating part of a configuration of the lightwave circuit according to an embodiment of the present invention.

As illustrated in FIG. 2B, the second optical waveguide 110 is constituted of a lower cladding layer 116a formed on the second substrate 111, the second core 115 formed on the lower cladding layer 116a, and an upper cladding layer 116b formed on the lower cladding layer 116a while covering the second core 115. The cladding 116 is constituted of the lower cladding layer 116a and the upper cladding layer 116b.

According to the present embodiment, the second optical waveguide 110 can change a direction of the light path of the light guided in the first optical waveguide 100 to a direction substantially vertical to the plane of the first optical waveguide 100 (the first substrate 101).

In recent years, research and development of ultrahigh-Δ optical waveguides having a large refractive index difference (relative refractive index difference Δ) between a core and a cladding has been progressively carried out, and a quartz-based optical waveguide having a non-refractive index difference Δ of 10% has been achieved. Thus, in an optical waveguide with Δ of 10%, a minimum bending radius can be 0.5 mm, and thus it is possible to bend the optical waveguide at low loss (approximately 0.1 dB/point or less) with a radius smaller than the substrate thickness and the plate thickness of reinforcement glass used at the mounting time (Reference 1: M. Itoh et al., "Low-Loss Silica-Based SiO2-Ta2O5 Waveguides With Extremely High Δ Fabricated Using Sputtered Thin Films", Journal of Lightwave Technology, vol. 33, no. 2, pp. 318-323, 2015).

Figure 3:
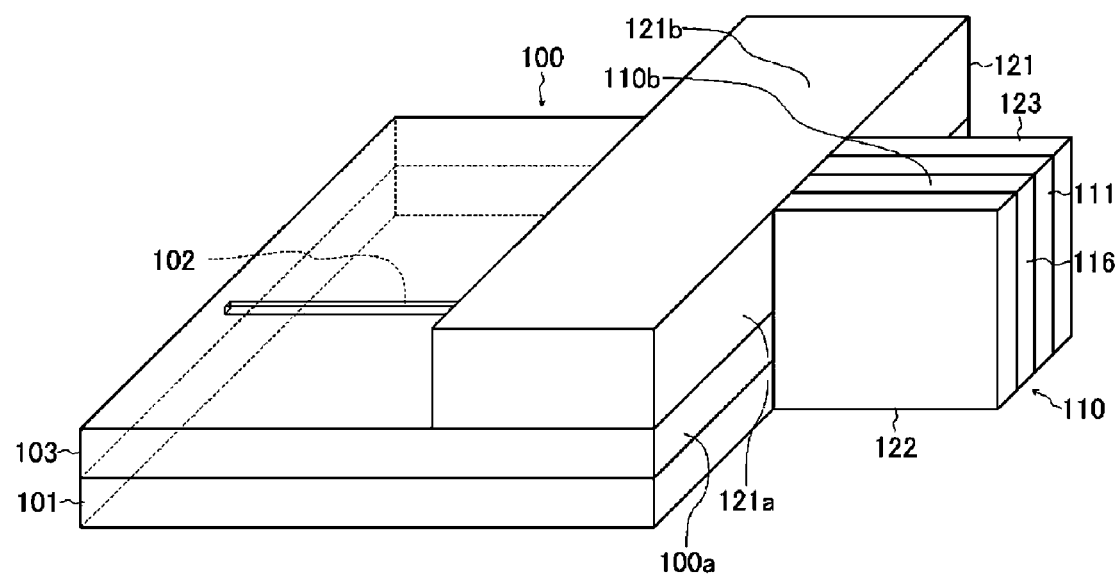
FIG. 3 is a perspective view illustrating a configuration of another lightwave circuit according to an embodiment of the present invention.

As illustrated in FIG. 3, in the lightwave circuit according to an embodiment, a reinforcement member 121 may be provided on the first optical waveguide 100 at a portion proximate to a portion including the second core 115 of the second optical waveguide 110. The reinforcement member 121 may be adhesively fixed onto the first optical waveguide 100 (cladding 103) using an adhesive agent, for example. A side surface 121a of the reinforcement member 121 adjacent to a portion where the incoming/outgoing end 102a of the first optical waveguide 100 is disposed is disposed on the same plane as the side surface 100a.

In this case, a top surface 121b of the reinforcement member 121 and a side surface 110b of the second optical waveguide 110 where an incoming/outgoing end face of a portion including the second core 115 is disposed are disposed on the same plane.

A reinforcement member 122 and a reinforcement member 123 may also be provided so as to sandwich the second optical waveguide 110. The reinforcement member 122 may be adhesively fixed on the second optical waveguide 110 (cladding 116) using an adhesive agent. Similarly, the reinforcement member 123 may be adhesively fixed to the rear surface of the second substrate 111 using the adhesive agent.

Conventionally, in optical connection and mounting of a quartz-based lightwave circuit (a quartz-based optical waveguide) and a fiber block, the plate thickness of a reinforcement member (for example, a glass plate) provided on the upper cladding layer is approximately 1 mm. In contrast, in the optical waveguide in which Δ is equal to 10% as described above, the minimum bending radius is 0.5 mm, and even when the second optical waveguide 110 configured to bend the wave-guiding direction by 90 degrees with the bending portion 114 that is connected being slanted by 90 degrees with respect to the first optical waveguide 100, it is possible to carry out a design in such a manner that the side surface 110b of the second optical waveguide 110 and the top surface 121b of the reinforcement member 121 are coordinated to form the same plane.

The change of the angle of the outgoing direction of the first optical waveguide 100 by the second optical waveguide 110 including the bending portion 114 has a degree of freedom based on design. Therefore, by setting the above angle to an angle coordinated with an incoming/outgoing angle with respect to a silicon photonics device including a grating coupler as an optical connection structure, it is also possible to highly efficiently couple optical input/output light with respect to the silicon photonics device.

Next, making of a lightwave circuit constituted of a quartz-based optical waveguide will be described. For example, a thermal oxide film layer is formed by thermal oxidation on a substrate made of silicon, and then a lower cladding layer is formed using flame hydrolysis deposition (FHD).

Subsequently, a glass layer made of $SiO_2$—$Ta_2O_5$ for forming a core is produced on the lower cladding layer. For example, the glass layer may be formed by depositing $SiO_2$—$Ta_2O_5$ on the lower cladding layer by a known sputtering method. Then, a processing mask layer of a waveguide pattern is formed on the glass layer by using a known photolithography technique to form the shape of the core. Subsequently, by using the formed mask pattern as a mask, for example, the glass layer is selectively etched by reactive ion etching (RIE) to form the core on the lower cladding layer. After the core is formed, the residual processing mask layer is removed.

After the core is formed as described above, an upper cladding layer is formed by using the FHD again, and thus a quartz-based optical waveguide having a structure in which the core is embedded in the cladding may be produced (NPLs 3 and 4). The relative refractive index difference (Δ) of the core with respect to the cladding is set to approximately 10%. The lower cladding layer has a thickness of 20 μm. The cross-sectional size of the core is approximately 1.5 μm×1.5 μm. In the above description, the FHD is used for depositing the glass serving as the cladding layer, but deposition techniques such as a chemical vapor deposition (CVD) method may also be used.

After the optical waveguide described above is formed on a wafer, the optical waveguide is cut into the chip-shaped first optical waveguide 100 of a desired size. The plate-like reinforcement member 121 made of glass is adhesively fixed onto the top surface of the chip-shaped first optical waveguide 100 for the reinforcement at the time of mounting and connection. The side surface 100a (side surface 121a) serving as an outgoing end face was polished. The reinforcement member 121 may be made of borosilicate-based glass having a thermal expansion coefficient value close to that of the silicon of the substrate.

Further, separate from the first optical waveguide 100, the second optical waveguide 110 is produced in the same manner as described above. In the second optical waveguide 110 as well, the relative refractive index difference (Δ) is set to approximately 10%. The bending portion 114 has a configuration (optical waveguide) in which the bending radius is 500 μm and the wave-guiding direction is bent by 90 degrees. The first portion 112 and the second portion 113 are each formed into a linear shape. The plate-like reinforcement members 122 and 123 made of glass are adhesively fixed to the second optical waveguide 110 for the reinforcement at the time of mounting and connection. The side surface 110a and the side surface 110b serving as incoming/outgoing end faces were polished. The reinforcement members 122 and 123 may be made of borosilicate-based glass having a thermal expansion coefficient value close to that of the silicon of the substrate.

Subsequently, the second optical waveguide 110 is connected to the first optical waveguide 100. The incoming/outgoing end 102a of the first optical waveguide 100 and the incoming/outgoing end 115a of the first portion 112 of the second optical waveguide 110 are brought into contact with each other and optically connected. This connection enables a configuration in which an extension direction of the second portion 113 is the normal direction of the plane of the first optical waveguide 100. In the connection between the first optical waveguide 100 and the second optical waveguide 110 described above, the positional relationship between the first optical waveguide 100 and the second optical waveguide 110 was adjusted (aligned) in such a manner that the intensity of the output light from the incoming/outgoing end face disposed on the side surface 110b became maximum, and the beam intensity profile of the output light was approximately Gaussian shaped. An ultraviolet curing adhesive agent was used to connect and fix the first optical waveguide 100 and the second optical waveguide 110 to each other. As a result, the lightwave circuit is obtained as illustrated in FIG. 3.

Figure 4:
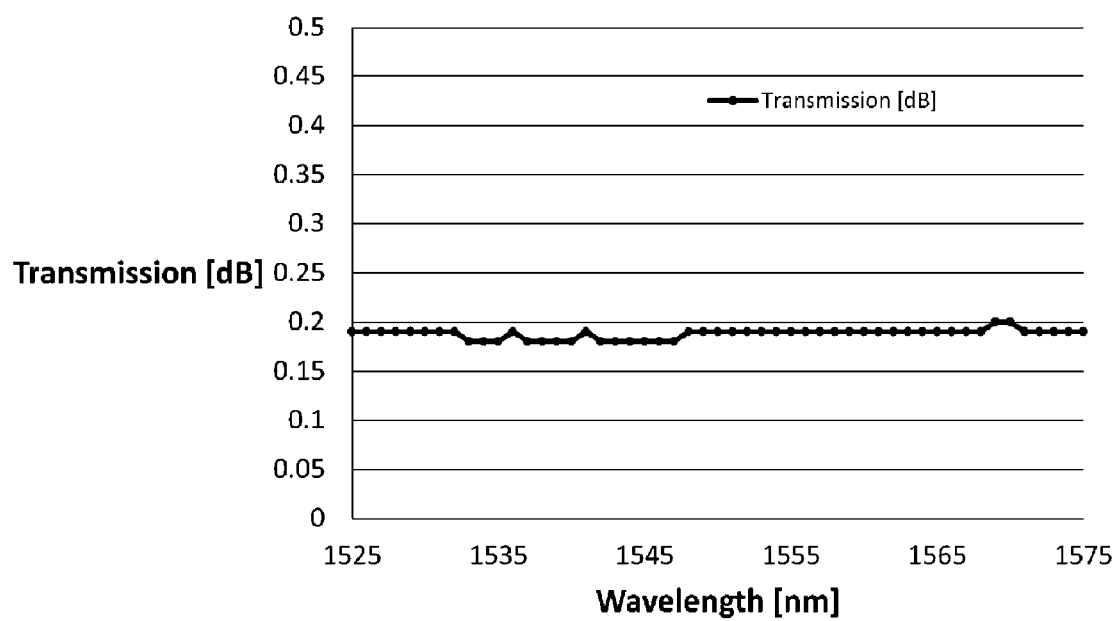
FIG. 4 is a characteristic diagram illustrating transmission spectrum characteristics of a lightwave circuit constituted of a first optical waveguide and a second optical waveguide in an embodiment.

The coupling loss between the first and second optical waveguides 100 and 110 at a wavelength of 1.55 µm was approximately 0.1 dB. The total loss of the propagation loss including loss in the bending portion 114 of the second optical waveguide 110 and the coupling loss was equal to or smaller than 0.2 dB for the light of 1.55 µm band. FIG. 4 illustrates transmission spectrum characteristics of the lightwave circuit constituted of the first optical waveguide 100 and the second optical waveguide 110.

Figure 5:
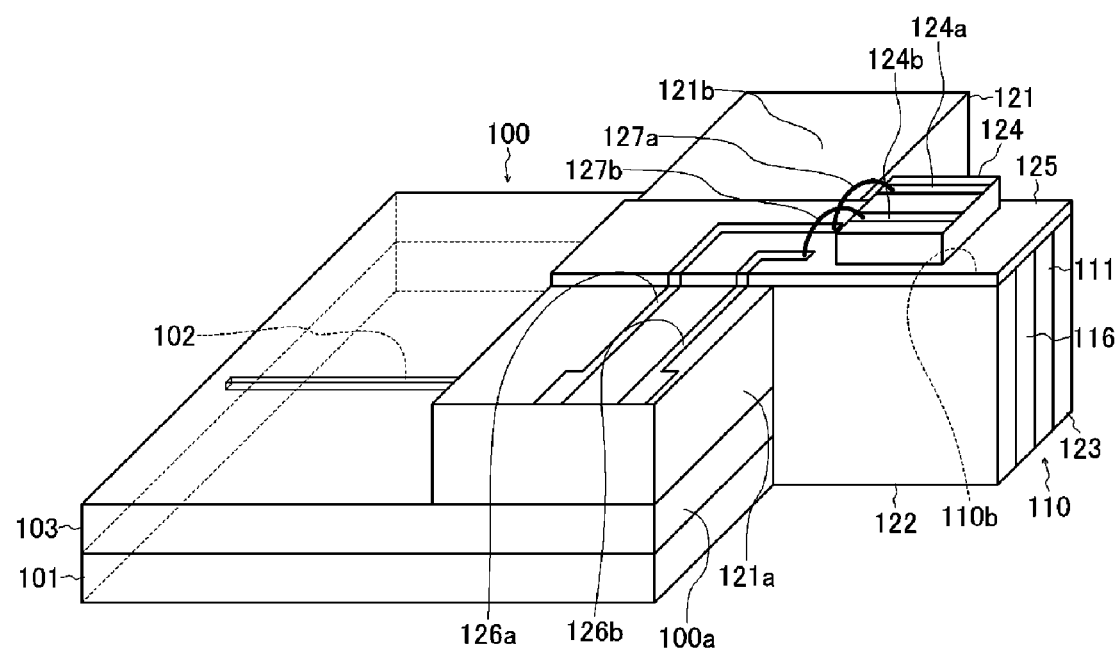
FIG. 5 is a perspective view illustrating a configuration of another lightwave circuit according to an embodiment of the present invention.
Figure 6:
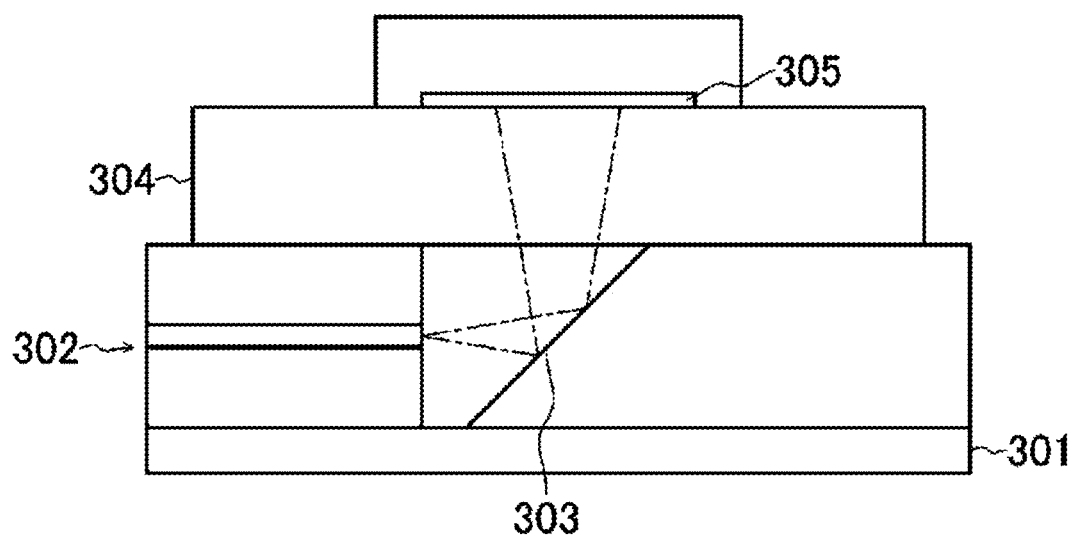
FIG. 6 is a configuration diagram illustrating a configuration of a conventional lightwave circuit.
Figure 7:
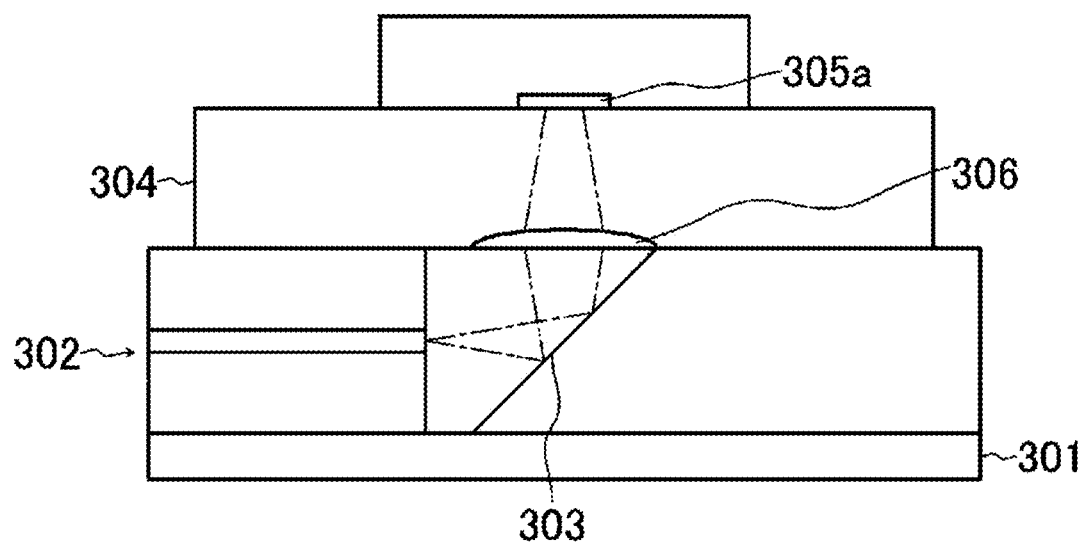
FIG. 7 is a configuration diagram illustrating a configuration of a conventional lightwave circuit.

As illustrated in FIG. 5, it is possible to dispose, on the side surface 110b of the second optical waveguide 110, a light-receiving element 124 configured to receive the light output from the incoming/outgoing end face of the side surface 110b. The light-receiving element 124 is, for example, a photodiode. In this example, the light-receiving element 124 is disposed above the side surface 110b via a glass film 125. The glass film 125 is formed extending from the side surface 110b to the top surface 121b. A wiring line 126a and a wiring line 126b are formed on the glass film 125 and on the top surface 121b. The wiring line 126a is electrically connected to a terminal 124a of the light-receiving element 124 by a wire 127a, and the wiring line 126b is electrically connected to a terminal 124b of the light-receiving element 124 by a wire 127b.

As described above, the top surface 121b of the reinforcement member 121 and the side surface 110b of the second optical waveguide 110 where the incoming/outgoing end face of a portion including the second core 115 is disposed are disposed on the same plane. Polishing is performed to further flatten the above-discussed surfaces and improve surface accuracy by correcting a positional shift between the top surface 121b and the side surface 110b, and thereafter $SiO_2$ is deposited by using a sputtering method so as to form the glass film 125.

An anti-reflection coating (AR coating layer) is formed on a top surface of the glass film 125, and the light-receiving element 124 is provided on the coating. Because the light-receiving element 124 is disposed via the glass film 125, the light-receiving element 124 can be protected from influence of the connection between the first optical waveguide 100 and the second optical waveguide 110, gas from the adhesive agent used for adhesion of the reinforcement members, and the like, thereby making it possible to enhance the reliability of the light-receiving element 124.

As described above, the coupling loss between the first optical waveguide 100 and the second optical waveguide 110 at a wavelength of 1.55 µm is approximately 0.1 dB, and the total loss of the propagation loss including the loss in the bending portion 114 of the second optical waveguide 110 and the coupling loss is equal to or smaller than 0.2 dB for the light of 1.55 µm band. In this lightwave circuit, a light-receiving sensitivity property of the light-receiving element 124 was 0.85 A/W for 1.55 µm input light to the first optical waveguide 100.

Instead of the light-receiving element 124, a semiconductor laser may be disposed, and light emitted from the semiconductor laser may be output from the first optical waveguide 100 via the second optical waveguide 110. With this configuration, coupling efficiency higher than that of conventional techniques using mirrors was obtained.

As described above, according to embodiments of the present invention, a light path of the guided light is changed in the second optical waveguide including the bending portion, and therefore it is possible to produce the lightwave circuit more easily without causing degradation in performance, reliability, and the like. According to embodiments of the present invention, it is possible to more easily produce a lightwave circuit that contributes to stack-mounting, high-density and high-integration, and a reduction in footprint while suppressing an increase of the manufacturing process without causing a decrease in manufacturing yield and degradation in performance, reliability, and the like.

Meanwhile, the present invention is not limited to the embodiment described above, and it will be obvious to those skilled in the art that various modifications and combinations can be implemented within the technical idea of the present invention.

REFERENCE SIGNS LIST

100 First optical waveguide
100a Side surface
101 First substrate
102 First core
102a Incoming/outgoing end
103 Cladding
110 Second optical waveguide
110a Side surface
111 Second substrate
112 First portion
113 Second portion
114 Bending portion
115 Second core
115a Incoming/outgoing end
116 Cladding

The invention claimed is:

1. A lightwave circuit comprising:
a first optical waveguide disposed on a first substrate, the first optical waveguide comprising an incoming/outgoing end; and
a second optical waveguide disposed on a second substrate, wherein the second optical waveguide comprises:
a first portion in which a wave-guiding direction is a first direction parallel to a plane of the first substrate, wherein an incoming/outgoing end of the first portion of the second optical waveguide is optically connected to the incoming/outgoing end of the first optical waveguide;
a second portion in which the wave-guiding direction is a second direction that is at a predetermined angle with respect to the plane of the first substrate, wherein the predetermined angle is equal to an angle defined between the plane of the first substrate and a plane of the second substrate; and
a bending portion connecting the first portion and the second portion; and a reinforcement member on the first optical waveguide at a portion proximate to the second optical waveguide, wherein a top surface of the reinforcement member and an incoming/outgoing end face of a portion including the second optical waveguide are on an identical plane.

2. The lightwave circuit according to claim 1, wherein a side surface of the second optical waveguide at a portion including the first portion is in contact with a side surface of the incoming/outgoing end of the first optical waveguide.

3. The lightwave circuit according to claim 1, wherein the predetermined angle is approximately 90 degrees.

4. The lightwave circuit according to claim 1, wherein the first optical waveguide and the second optical waveguide primarily comprise quartz-based glass.

5. The lightwave circuit according to claim 1, wherein the second optical waveguide comprises a core and a cladding, and wherein a relative refractive index difference between the core and the cladding of the second optical waveguide has a value such that propagation loss in the bending portion is equal to or smaller than 0.1 dB.

6. A method of providing a lightwave circuit, the method comprising:
    providing a first optical waveguide on a first substrate, wherein the first optical waveguide comprises an incoming/outgoing end; and
    providing a second optical waveguide on a second substrate, wherein the second optical waveguide comprises:
        a first portion in which a wave-guiding direction is a first direction parallel to a plane of the first substrate, wherein an incoming/outgoing end of the first portion of the second optical waveguide is optically connected to the incoming/outgoing end of the first optical waveguide;
        a second portion in which the wave-guiding direction is a second direction that is at a predetermined angle with respect to the plane of the first substrate, wherein the predetermined angle is equal to an angle defined between the plane of the first substrate and a plane of the second substrate; and
        a bending portion connecting the first portion and the second portion; and
    providing a reinforcement member on the first optical waveguide at a portion proximate to the second optical waveguide, wherein a top surface of the reinforcement member and an incoming/outgoing end face of a portion including the second optical waveguide are on an identical plane.

7. The method according to claim 6, wherein a side surface of the second optical waveguide at a portion including the first portion is in contact with a side surface of the incoming/outgoing end of the first optical waveguide.

8. The method according to claim 6, wherein the predetermined angle is approximately 90 degrees.

9. The method according to claim 6, wherein the first optical waveguide and the second optical waveguide primarily comprise quartz-based glass.

10. The method according to claim 6, wherein the second optical waveguide comprises a core and a cladding, and wherein a relative refractive index difference between the core and the cladding of the second optical waveguide has a value such that propagation loss in the bending portion is equal to or smaller than 0.1 dB.

11. A lightwave circuit comprising:
    a first optical waveguide disposed on a first substrate, the first optical waveguide comprising a first core having an incoming/outgoing end;
    a second optical waveguide disposed on a second substrate, wherein the second optical waveguide comprises a second core, the second core comprising:
        a first portion in which a wave-guiding direction is a first direction parallel to a plane of the first substrate, wherein a first incoming/outgoing end of the first portion of the second core is disposed on a first side surface of the second optical waveguide and is optically connected to the incoming/outgoing end of the first core of the first optical waveguide;
        a second portion in which the wave-guiding direction is a second direction that is at a predetermined angle with respect to the plane of the first substrate, wherein the predetermined angle is equal to an angle defined between the plane of the first substrate and a plane of the second substrate, and wherein a second incoming/outgoing end of the second portion of the second core is disposed on a second side surface of the second optical waveguide perpendicular to the first side surface; and
        a bending portion connecting the first portion and the second portion;
    a light-receiving element disposed above the second incoming/outgoing end of the second portion of the second core on the second side surface of the second optical waveguide, wherein the light-receiving element is configured to receive light output from the second incoming/outgoing end of the second portion of the second core; and
    a reinforcement member on the first optical waveguide at a portion proximate to the second optical waveguide, wherein a top surface of the reinforcement member and an end face of the second incoming/outgoing end of the second portion on the second side surface of the second optical waveguide are on an identical plane.

12. The lightwave circuit according to claim 11, wherein the first side surface of the second optical waveguide at a portion including the first portion is in contact with a side surface of the incoming/outgoing end of the first core of the first optical waveguide.

13. The lightwave circuit according to claim 11, wherein the predetermined angle is approximately 90 degrees.

14. The lightwave circuit according to claim 11, wherein the first optical waveguide and the second optical waveguide primarily comprise quartz-based glass.

15. The lightwave circuit according to claim 11, wherein the second optical waveguide comprises a cladding, and wherein a relative refractive index difference between the second core and the cladding of the second optical waveguide has a value such that propagation loss in the bending portion is equal to or smaller than 0.1 dB.

16. The lightwave circuit according to claim 11, wherein the light-receiving element comprises a photodiode disposed above the second side surface of the second optical waveguide via a glass film.

* * * * *